July 27, 1948.    W. E. BELCHER, JR    2,446,153
RE-CALIBRATING MOTOR CONTROL SYSTEM
Filed Dec. 7, 1946    2 Sheets-Sheet 1

*INVENTOR.*
WALLACE E. BELCHER JR.
BY Arthur H. Swanson
ATTORNEY

July 27, 1948.  W. E. BELCHER, JR  2,446,153
RE-CALIBRATING MOTOR CONTROL SYSTEM
Filed Dec. 7, 1946  2 Sheets-Sheet 2

INVENTOR.
WALLACE E. BELCHER JR.
BY Arthur H. Swanson
ATTORNEY

Patented July 27, 1948

2,446,153

UNITED STATES PATENT OFFICE 2,446,153

RECALIBRATING MOTOR CONTROL SYSTEM

Wallace E. Belcher, Jr., Philadelphia, Pa., assignor to The Brown Instrument Company, Philadelphia, Pa., a corporation of Pennsylvania Application December 7, 1946, Serial No. 714,709

7 Claims. (Cl. 318—28)

1

The present invention relates to self-balancing measuring apparatus including a measuring circuit network, and particularly to the type of such apparatus including a potentiometric bridge circuit and automatic mechanism for periodically recalibrating the bridge circuit, as well as automatic mechanism for rebalancing the measuring apparatus, and in which each automatic mechanism is actuated by a reversible electric motor. The latter may be the same motor in some cases, and in other cases a separate reversible actuating motor may be used to actuate each mechanism. A general object of the invention is to provide simple and effective means to prevent motor overtravel and to provide a needed safety action or effect.

In the use of a reversible motor for rebalancing or recalibrating the above mentioned apparatus, difficulty has been frequently experienced from a tendency to motor overtravel at the end of each rebalancing or recalibrating operation. While the control system for the motor is customarily adapted to interrupt the supply of energizing current to the motor when the balanced or recalibration condition of the apparatus is attained, the inertia of the motor prevents it from stopping as soon as it is deenergized. The resultant motor overtravel necessitates a new rebalancing or recalibrating operation. Such unnecessary rebalancing and recalibrating operations are inherent sources of measuring inaccuracy, and in some cases result in continuous hunting, or periodic rebalancing or recalibrating operations alternately in opposite directions.

Trouble is also experienced in the use of apparatus of the above mentioned type, as a result of a break in the thermocouple or other source of voltage being measured, or in some other portion of the branch of the measuring circuit including said thermocouple or other voltage source. Unless provided with safety or protective provisions, ordinary self-balancing measuring apparatus operates following a break in the thermocouple circuit, as though the measuring apparatus were in balance, since the break, and the attainment of balance, are alike in that each prevents current from flowing through the measuring branch of the current network. The break is thus a source of false measurement.

Primary objects of the present invention are to provide simple and effective means for subjecting the motor, or motors, employed for rebalancing and recalibrating purposes, to a damping action operative to prevent motor overtravel at the end of a rebalancing or recalibrating operation, and for effecting a desirable safety action on a breakage in the thermocouple or in the circuit branch including the thermocouple or other source of voltage to be measured. A more specific object of the present invention is to include in the circuit network of measuring apparatus of the above mentioned type, a circuit portion which acts like a condenser during each recalibrating operation to damp and prevent overtravel of the recalibrating mechanism, and which acts during each measuring operation like a high resistance conductor for unidirectional current, and thereby effects down scale operation of the measuring apparatus in the event of a thermocouple break, or other break in the measuring circuit branch of the measuring apparatus. Said circuit portion may consist essentially of an electrolytic condenser through which unidirectional current slowly leaks, or it may consist of a non-leaky condenser with a high resistance in shunt to the condenser.

The various features of novelty which characterize my invention are pointed out with particularity in the claims annexed to, and forming a part of this specification. For a better understanding of the invention, however, its advantages, and specified objects attained by its use, reference should be had to the accompanying drawing and descriptive matter in which I have illustrated and described preferred embodiments of the invention.

Figure 1:
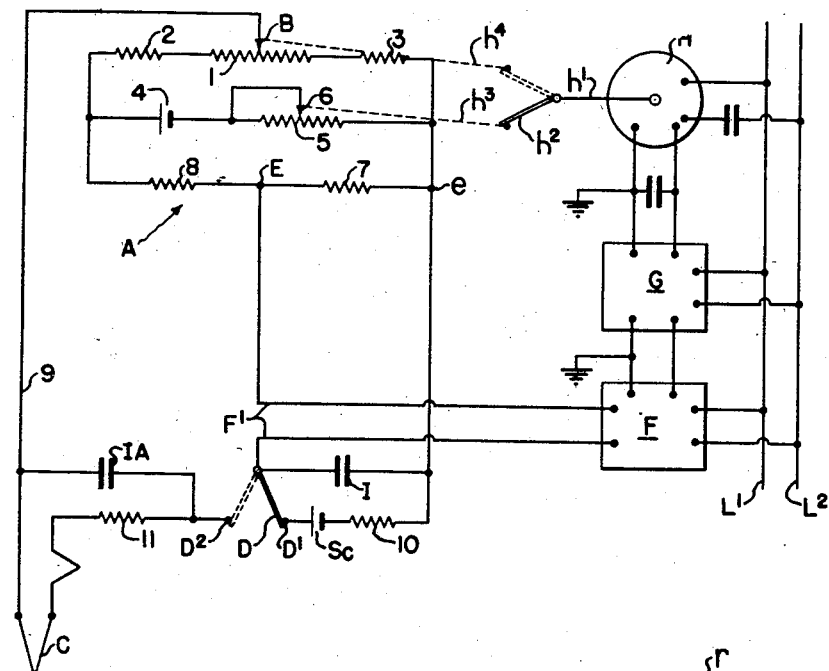
Fig. 1 is a diagram illustrating one embodiment of the present invention.

In Fig. 1 I have illustrated by way of example, an embodiment of my invention in measuring apparatus including a circuit network comprising a null type, split potentiometer circuit A of the conventional design having three branches. One of those branches includes a slide wire resistance 1 interposed between resistances 2 and 3 and engaged by a slider contact B adjustable along the length of the resistance 1. A second branch of the bridge circuit includes a bridge energizing battery or other source of voltage 4 and an adjustable resistance 5, and the third branch of the bridge circuit includes a recalibrating resistance 7 and a resistance 8 in series with the resistance 7, and connected to the latter at E. More or less of the resistance 5 is operatively included in the bridge circuit, depending upon the adjustment of an adjustable shunt including a contact 6 engaging and adjustable along the resistance 5. The recalibration of the bridge circuit comprises the adjustment of the contact 6 from time to time, as required to maintain a current flow through the battery 4, which will produce predetermined potential drops in the different fixed resistances in the bridge circuit.

The circuit network shown in Fig. 1 also comprises a recalibrating or standardizing circuit branch and a measuring circuit branch. The standardizing circuit branch includes a standard cell Sc and a resistance 10 which are connected in series between a stationary switch contact D' and the bridge circuit point e to which the terminal of the calibrating resistance 7 remote from the point E is connected. The measuring circuit branch includes a thermocouple C, a conductor 9 which connects one terminal of the thermocouple C to the slider contact B, and a resistance 11 connecting the second terminal of the thermocouple to a stationary switch contact $D^2$. The contacts D' and $D^2$ form part of a switch mechanism including a pivoted switch member D. The latter has two operative positions, namely, a recalibrating position in which it engages the contact D', and a rebalancing position in which it engages the contact $D^2$. The switch member D is connected to one of the input circuit terminals F'' of an electrical current flow responsive or detection element F which has its second input circuit terminal connected to the bridge circuit at the point E.

When the switch member D occupies its recalibrating position, shown in full lines in Fig. 1, the standard cell Sc and resistance 10 are included in a shunt to the calibrating resistance 7. When the bridge circuit is properly calibrated, the potential drop in the resistance 7 is equal to, and in bucking relation with the voltage of the standard cell Sc, and there is then no current flow in the input circuit of the element F. When the switch D is in its rebalancing position, shown in dotted lines in Fig. 1, in which it engages the contact $D^2$, the thermocouple C and resistance 11 are connected in series between the point E of the bridge circuit and the point along the slide wire resistance 1 engaged by the contact B. In the balanced condition of the apparatus the potential difference between bridge point E and contact B is equal to the opposing voltage of the thermocouple C and there is no current flow in the input circuit of the element F.

In the arrangement shown in Fig. 1, current flow in the input circuit of the element F operates through control apparatus G to actuate a reversible motor H for operation in a direction dependent on the direction of the current flow. When the switch member D is in engagement with the contact D', current flow through the input circuit of the device F indicates that the bridge circuit is not properly calibrated, and the motor H then operates through a mechanical connection shown diagrammatically as including elements $h'$, $h^2$ and $h^3$ to adjust the slider contact 6 in the direction and to the extent required to recalibrate the bridge circuit. When the switch member D is in engagement with the stationary contact $D^2$, current flow through the input circuit of the element F indicates that the measuring system is unbalanced and the motor H then operates through a mechanical connection, including elements $h'$, $h^2$ and $h^4$ to adjust the contact B along the slide wire resistance 1 in the direction and to the extent required to rebalance the measuring system and thereby interrupt current flow through the input circuit of the element F.

Insofar as above described, the apparatus shown diagrammatically in Fig. 1, is well known and is a typical example of apparatus of the kind which it is the object of the present invention to improve. The detection element F, control apparatus G and control mechanism H may be of various known or suitable forms. In particular they may be and are herein assumed to be, of the type employed in the conversion type potentiometer now in general use in this country. In that potentiometer element F is a converter which utilizes unidirectional current flow in its input circuit to create an alternating current signal which is impressed on the apparatus G, and the latter is an electronic voltage amplifying and motor drive system supplying current to the control winding of the motor H. The latter has a power winding also, which is connected to conductors L' and $L^2$ supplying alternating current of commercial frequency and voltage, for example, 60 cycles per second and 115 volts. The control and power windings of a motor H are shown diagrammatically in Fig. 3.

When the apparatus G supplies current to the control winding, that winding and the power winding of the motor H cooperate to create a magnetic field which rotates in one direction or the other and correspondingly revolves the rotor of the motor. The direction in which said magnetic field rotates depends upon the direction of current flow in the input circuit of the element F. This results from the fact that the alternating signal impressed on the control apparatus G by the element F is approximately in phase with the voltage across the supply conductors L' and $L^2$, or is 180° out of phase with that voltage, accordingly as the current flow in the input circuit of the element F is in one direction or the other.

The converter type potentiometer is disclosed and claimed in the application of Walter P. Wills, Serial No. 421,173, filed December 1, 1941, now Patent 2,423,540, issued July 8, 1947, and is also disclosed in the Wills Patent 2,385,481, of September 5, 1945, and further references herein to the form and operation of the means diagrammatically illustrated for controlling the operation of the motor H are therefore unnecessary.

In the form of embodiment of the invention shown in Fig. 1, a leaky condenser I, which may be a commercially available electrolytic or "wet" condenser is permanently connected between the bridge point e and the switch member D, and a condenser IA is permanently connected in shunt to the thermocouple C and resistance 11. The leakage characteristics of the condenser I should be such that a voltage across the condenser of a volt or two, will cause a direct current of the order of microamperes to leak through the condenser. The leakage characteristic of the condenser I is used to insure a "safe failure" when a break in the thermocouple, or elsewhere in the measuring branch occurs during a measuring operation. In recalibration, the condenser I prevents overtravel by virtue of its electric charge holding capacity, and current leakage through the condenser then serves no useful purpose but is too small to be practically detrimental.

In the calibrating condition of the apparatus, in which the switch member D engages the contact D', the condenser I is connected in shunt to the resistance 7 and in shunt to the circuit branch including the resistance 10 and standard cell Sc, and produces a desirable motor damping action by virtue of the fact that since time is required to charge and to discharge the condenser, the condenser voltage tends to be intermediate the voltage of the standard cell and the potential drop in the resistance 7, during the recalibration action. In the measuring condition of the apparatus, in which the switch member D engages the contact D², the condenser I is not operatively connected to the standard cell and serves no useful purpose while the measuring branch of the circuit network is intact. On a break in the thermocouple or elsewhere in the measuring branch so that the latter cannot pass current between the point E and slider contact B, the condenser provides a high resistance path of current flow for direct current through the detector element F between the points E and e. The direction of that current flow is such that its effect on the detector F is the same as the effect produced by a decrease in the thermocouple voltage. In consequence the motor H then operates continuously to move the contact B in the down scale direction until the slider contact B reaches the left hand or low limit of its range of adjustment.

Overtravel of the motor H in rebalancing operations is prevented in a known manner by the condenser IA. The latter is in shunt to the thermocouple C and resistance 11 at all times, and when the switch member D is in engagement with the contact D², the condenser IA is also connected in shunt to the portion of the bridge circuit including the resistances 8 and 2, and the portion of the resistance 1 at the left of the contact B.

For its desired motor damping operation during recalibration operations, the capacity of the condenser I and the magnitude of the resistance 10 should be chosen and related to insure that the condenser I will charge or discharge during each operation, at a rate suitably related to the inertia of the motor H. Furthermore, the resistance 10 should be substantially larger than the resistance 7. With the recalibrating circuit branch operatively connected in the circuit network, a difference between the voltage of the standard cell Sc and the voltage drop in the resistance 7 causes the condenser I to charge or discharge at a rate dependent upon the capacity of the condenser and upon the amount of resistance then included in the condenser charging or discharging circuit, as well as upon said voltage difference. The resistance 10 then connected in series with the condenser I reduces the condenser charging or discharging current, and thereby delays the application of the full effect of the above mentioned voltage difference to the control winding of the motor H. Such delay action is increased or decreased by respectively increasing or decreasing the rate at which the condenser I charges or discharges.

Overtravel of the motor, due to its inertia, is avoided when the retarding action of the condenser I results in such attenuation of the current in the control winding of the motor H and such slowing down of the motor during the final portion of each recalibrating operation, that the motor inertia will not prevent the motor from stopping at the instant at which the recalibrating operation is completed and current flow in the input circuit of the element F is interrupted.

In explanation of the motor damping action, it is to be noted that when the switch D is adjusted into its full-line position to initiate a recalibrating operation, the existing condenser charge, and hence the condenser E. M. F. will ordinarily differ from the E. M. F. of the standard cell Sc and from the potential drop in, or E. M. F. of, the calibrating resistance 7. Ordinarily, on the initiation of a recalibrating operation the E. M. F. of resistance 7 will be smaller than the standard cell E. M. F., since recalibration of a potentiometer bridge circuit is ordinarily required as a result of the progressive decrease in the voltage of the energizing battery as the latter ages.

When the condenser E. M. F. and standard cell E. M. F. are different, their equalization requires a flow of a condenser charging or discharging current between the terminals of the cell Sc and condenser I. That current is kept small by the resistance 10, which thus delays the equalization, and complete equalization cannot be effected until current ceases to flow between the condenser and standard cell through the resistance 10, and until such equalization is effected the recalibrating action is incomplete.

There is no delay element or action in the circuit through which the condenser E. M. F. and the E. M. F. of the resistance 7 are opposed. In consequence, current flow between the resistance 7 and the condenser I quickly gives the condenser I an E. M. F. intermediate the E. M. F. of the standard cell and the E. M. F. of the resistance 7. The current flow between the resistance 7 and condenser I results in a prompt response by the detector element F and a prompt energization of the motor H for operation in the direction required to recalibrate the bridge circuit.

The current flow through the input circuit of the detector element F results from the difference between the E. M. F. of resistance 7 and the E. M. F. of the standard cell Sc, but the magnitude of said current flow depends upon the difference between the E. M. F. of the resistance 7 and the condenser E. M. F. In consequence, as the recalibrating operation proceeds and the difference between the E. M. F. of resistance 7 and the condenser E. M. F. diminishes, the operating current in the control winding of the motor H is reduced. In some cases that current may be temporarily interrupted or even reversed before recalibration is effected. Such interruption or reversal does not ordinarily interrupt the rotation of the motor owing to the inertia of the latter. However, until the E. M. F. of resistance 7 becomes equal to the E. M. F. of the cell Sc, the condenser E. M. F. will continue to vary in the direction needed to make it equal to the standard cell E. M. F. During the final portion of the recalibrating operation the difference between the various E. M. F.'s is reversed in polarity, and consequently, the motion of the motor H is retarded. In consequence, if the apparatus is properly designed in accordance with the principles of the present invention, the motor will be retarded immediately prior to the attainment of complete recalibration so that it will have no inertia tendency to overtravel, and will stop as soon as recalibration is attained and interruption of the supply of motor driving current to the control winding of the motor H is effected.

When the switch member D is shifted to engage the contact D² for a measuring action the condenser I ceases to subject the motor H to any damping action. However, the condenser IA and resistance 11 then coact with the portions of the bridge circuit including the resistances 8 and 2 and the portion of the resistance 1 at the left of the contact B, to damp and prevent overtravel of the motor H during each rebalancing operation as do the condenser I and resistance 10 during the recalibrating period.

The values for the resistances 10 and 11 may well be dependent upon other resistance values in the circuit network, as well as on the capacity of the condensers I and IA. Such other resistance values may vary through a considerable range as a result of variations in bridge circuit design and in the conditions of operation. By way of illustration and example, and not by way of limitation, it is noted that in one typical bridge circuit of the type and form shown in Fig. 1, the various resistances have values as follows:

| | Ohms |
|---|---|
| Resistance 1 | 11.94 |
| Resistance 2 | 1.979 |
| Resistance 3 | 243.2 |
| Resistance 5 | 105.0 |
| Resistance 7 | 5.255 |
| Resistance 8 | 509.5 |
| Resistance 10 | 5000.0 |
| Resistance 11 | 150.0 |

With the bridge circuit resistance values just stated, each of the condensers I and IA may well have a capacity of 500 mmf., and the resistance 10 may well vary between 1500 ohms in wide scale range operations of the potentiometer, and 7500 ohms for narrow scale range operations, and may have intermediate values for operations with an intermediate scale range. As those skilled in the art understand, the scale range of a potentiometer of the type shown in Fig. 1, is a function of the change in the thermocouple voltage or other voltage being measured which is required to effect movement of the contact B from one end to the other of its range of movement along the slide wire resistance. The scale range may be varied by varying the resistance value of the slide wire resistance 1, but ordinarily is effected by other variations in bridge circuit resistance values, as is well known to those skilled in the art.

In rebalancing operations, the E. M. F. of the condenser IA is related to the E. M. F. of the thermocouple C and to the potential drop in, or E. M. F. of the portion of the bridge circuit including the resistance 8, resistance 2 and the portion of the resistance 1 at the left of the contact B, generally as the E. M. F. of condenser I is respectively related to the E. M. F. of the standard cell Sc and the E. M. F. of the resistance 7 in recalibrating operations. The condenser IA and resistance 11 cooperate to damp the rebalancing operation of the motor H in substantially the same manner in which the condenser I and resistance 10 cooperate to damp the recalibrating operation of the motor H. It is to be noted, however, that in the rebalancing operations each of the three related E. M. F.'s may vary during the rebalancing operation, whereas in the recalibrating operation the E. M. F. of the standard cell Sc is constant. In rebalancing, the E. M. F. of the potentiometer resistances between the point E and contact B is varied by adjustment of the latter along the slide wire resistance 1, generally as the E. M. F. of the resistance 7 is varied in the recalibrating operations by the adjustment of the contact 6 along the resistance 5.

Figure 1A:
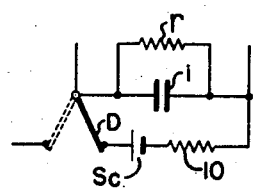
Fig. 1a is a diagram illustrating a modification of a portion of the circuit shown in Fig. 1.

The motor damping capacity function of the condenser I in recalibrating operations and its resistance function in rebalancing operations, may be served by other means than the leaky electrolytic condenser I shown in Fig. 1. Thus for example, there may be used in lieu of the condenser I, a condenser i and a resistance r in parallel therewith as shown in Fig. 1a. With suitable capacity and resistance values for the elements i and r, the latter will collectively serve the motor damping and safe failure purposes which are served in the Fig. 1 arrangement by the condenser I. It is to be noted as a characteristic advantage of the present invention that the use of separate condensers I and IA for damping purposes, permits the time constant of the circuit including condenser I and resistance 10, to be independent of the time constant of the circuit including the condenser IA and resistance 11.

Figure 2:
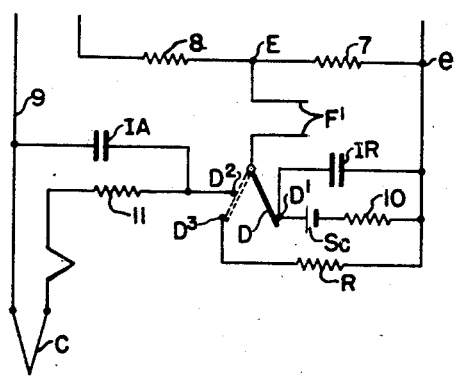
Fig. 2 is a diagram illustrating a modification of a portion of the circuit shown in Fig. 1.

As has been made apparent, in the operation of the apparatus shown in Fig. 1, the condenser I serves a recalibration purpose because it has capacitance, and serves a rebalancing purpose because it provides a high resistance path of flow for direct current. The capacitance of the condenser I serves no useful purpose in rebalancing operations, and, the high resistance path of flow for direct current which it provides, serves no useful purpose in standardizing operations. The general results obtainable with the apparatus shown in Fig. 1, may thus be obtained with apparatus like that shown in Fig. 2 in which the leaky condenser I of Fig. 1 is replaced by a non-leaky condenser IR and a separate resistance R. The condenser IR is shown in Fig. 2 as permanently connected between bridge point e and contact D' in parallel with the standard cell Sc and resistance 10 and may be a paper condenser having a capacity of 20 microfarads and a working voltage of one volt. The resistance R of Fig. 2 has one terminal connected to point e and has its second terminal connected to a switch point D³ which is engaged by the switch member D and thereby connected through the detector device F to the bridge point E, only when the switch member D is in the position in which it engages the contact D² and puts the apparatus in its measuring condition.

Figure 3:
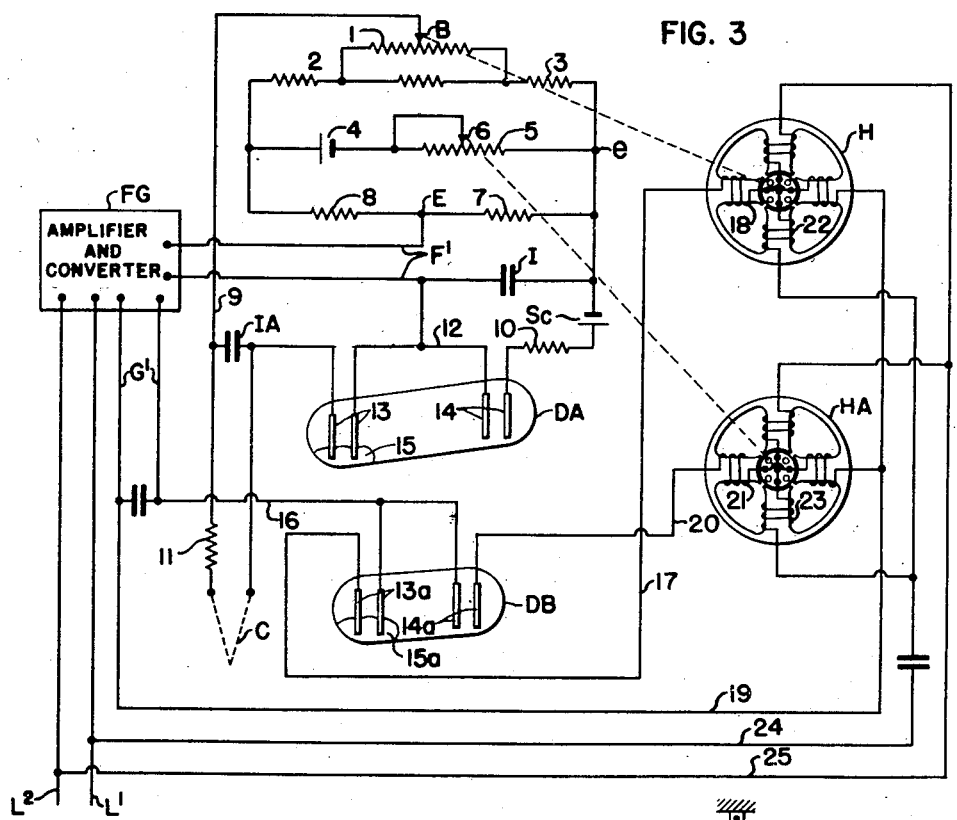
Fig. 3 is a diagram illustrating a second embodiment of the invention including separate balancing and recalibrating motor.

In some cases it is desirable to provide separate, reversible motors for the rebalancing and recalibrating operations in self balancing measuring apparatus embodying the present invention, and one such arrangement is illustrated in Fig. 3, wherein H is the rebalancing motor and HA is the recalibrating motor. Each of the motors H and HA of Fig. 3 may be exactly like the motor H of Fig. 1. The circuit network shown in Fig. 3 is essentially the same as that illustrated in Fig. 1, except for the substitution of a mercury switch DA, for switch D of Fig. 1, and for the addition of a separate motor HA for adjusting the regulator contact 6 of Fig. 3, and for the addition of a switch DB which is adjusted into a position to energize the recalibrating motor HA or the rebalancing motor H, when the switch DA is adjusted into its recalibrating position or into its rebalancing position, respectively.

In Fig. 3, the device FG includes the elements F and G of Fig. 1 and performs the function of both those elements. Its input terminals F'' are connected one to the bridge point E and the other to a conductor 12, which is connected to one of the pair of contacts or electrodes 13 extending into the envelope or body of the switch DA at the left end and to one of the pair of contacts or electrodes 14 extending into the switch envelope at its right end. The two contacts 13 coact with the body of mercury 15 in the switch DA to connect the thermocouple C and resistance 11 between the contact B and the bridge point E when the switch DA occupies its rebalancing position shown in Fig. 3. When the switch DA is tilted into its recalibrating position so that the mercury 15 moves from the left end to the right end of the switch envelope, the contacts 14 then connect the adjacent end of the resistance 10 to the bridge point E, so that the standard cell Sc is then connected in shunt to the bridge circuit resistance 7.

In Fig. 3 the condenser I is connected between the conductor 12 and the bridge point e, and the condenser IA is connected between the conductor 9 and the terminal of the thermocouple C which is connected to the switch DA. The condenser I is thus operatively connected in the network of Fig. 3 in each of the two operative positions of the switch DA, just as the condenser I is operatively connected in the network of Fig. 1, accordingly as the switch DA is in its recalibrating or in its rebalancing position.

Figure 4:
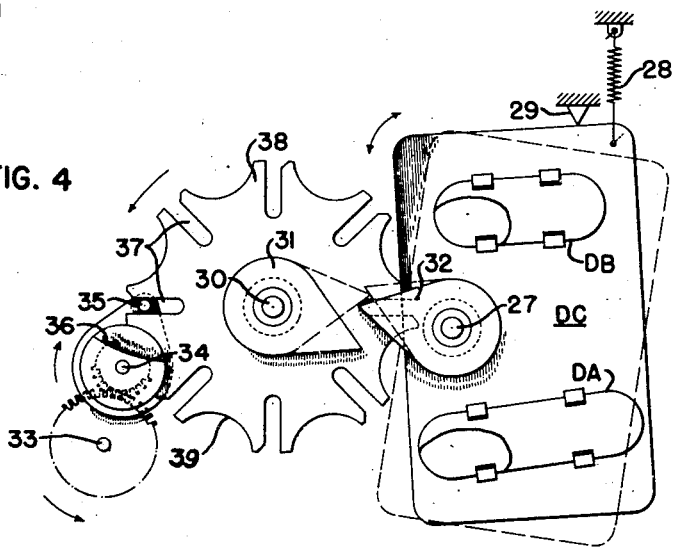
Fig. 4 is an elevation of switch actuating mechanism adapted for use in the form of the invention shown diagrammatically in Fig. 3.

The mercury switch DB may be a counterpart of the switch DA, though preferably the two switches are relatively proportioned and arranged as shown in Figs. 3 and 4, so that when the two switches are simultaneously adjusted to change from the potentiometric measuring operation to the potentiometer standardizing operation, the rebalancing motor H will be disconnected from, and the standardizing motor HB will be connected to the output circuit of the control apparatus FG before the potentiometric circuit has been adjusted into its standardizing condition. This prevents the apparatus from giving false movements to the recording pen or to control apparatus which, while not shown, is ordinarily included in potentiometric apparatus of the type disclosed and is given adjustments by the rebalancing motor simultaneously with the adjustments that motor gives to the slider contact B.

When the position of the switch DB is such that the mercury body 15a connects the contacts 13a at the left end of the switch DB and thereby connects the conductors 16 and 17, the control winding 18 of the rebalancing motor H has one terminal connected through the switch DB to the right output terminal G' of the control apparatus FG. The second terminal of the winding 18 is shown as permanently connected by a conductor 19 to the left output terminal G'. When the switch DB is shifted to move the mercury 15a into the right end of the switch envelope, the contacts 14a connect the conductor 16 to a conductor 20, and thereby connect one terminal of the control winding 21 of the recalibrating motor HA to the right terminal G' of the control apparatus FG. The second terminal of the winding 21 is permanently connected by the conductor 19 to the left output terminal G' of the apparatus FG. The power windings 22 and 23 of the motors H and HA, respectively, are connected in parallel between the branches 24 and 25 of the supply conductors L' and L².

For the general purposes of the present invention, the switch D of Fig. 1 and the switches DA and DB of Fig. 3 may be manually adjusted to effect recalibrating operations at the will of the operator, or they may be automatically adjusted to effect recalibrating operations at predetermined intervals. One arrangement for automatically effecting recalibration at predetermined time intervals is illustrated in Fig. 4, wherein the switches DA and DB of Fig. 3 are mounted on a support DC secured to a shaft 27 for oscillation between a rebalancing position and a recalibrating position shown in full and dotted lines, respectively, in Fig. 4. In the rebalancing position of the switch support DC, the mercury body in each switch is at the left-hand end of the latter, and in the recalibrating position of the support DC, the mercury is at the right-hand end of each switch. As shown, a bias spring 28 tends to hold the support DC in its rebalancing position in which it engages a stop 29.

During a short portion of each of intermittent rotative movements of shaft 30, a cam lever 31, carried by the shaft 30 engages a cam part 32 rigidly secured to the switch support DC and thereby oscillates the latter from its full line position into its dotted line position shown in Fig. 4. The cam parts 31 and 32 are so shaped and arranged that as the rotative movement of the shaft 30 continues, said parts separate and permit the switch support DC to turn back into its full line position a few seconds after the switch member has been moved into its dotted line position. As shown, the shaft 30 is intermittently rotated at suitably frequent intervals and with suitable rapidity, by a slow-speed, continuously rotating shaft 33 which acts on the shaft 30 through a Geneva stop motion shown as comprising the intermediate shaft 34, gear-connected to the shaft 33 and carrying a crank pin 35 and a notched disc 36. The crank pin 35 is adapted to successively move into and out of the different radial slots 37 formed in a disc or wheel element 38 carried by the shaft 30.

During the portion of each rotation of the shaft 34 in which the crank pin 35 is received in a corresponding radial slot 37 in the wheel or disc 38, the latter is angularly advanced through a fraction of a revolution. The magnitude of the fraction depends upon the number of radial slots 37 in the wheel 38. As shown, there are eight equally spaced radial slots 37 in the wheel 38, and the latter is given one-eighth of a turn for each revolution of the shaft 34. During periods in which crank pin 35 is not in operational engagement with the walls of a slot 37, the wheel or disc 38 is held against rotation by the engagement of the unnotched peripheral portion of the disc 36 with the corresponding concave edge portion 39 of the wheel 38, there being one such concave portion between the outer ends of each two adjacent radial slots 37. The disc 36 is cutaway or notched to permit angular movement of the wheel member 38 while the crank pin 35 is operatively received in a radial slot 37. In an ordinary recording potentiometer the shaft 33 may be a chart-advancing roll shaft, or may be some other shaft rotated at slow but constant speed by the chart driving motor. While the mechanism shown in Fig. 4 for tilting the switch carrier DC is well adapted for that purpose, other mechanisms may be employed for the same purpose.

As will be apparent to those skilled in the art, self balancing measuring apparatus, with which the present invention may be used to advantage, as diagrammatically illustrated herein, may be employed for all of the various measuring, recording and control purposes for which self balancing potentiometers, and particularly self balancing recording potentiometers, are adapted.

The invention claimed herein comprises improvements on an invention disclosed and claimed in the application, Serial No. 714,695, filed concurrently herewith by Lloyd B. Cherry, in which claims are made on novel subject matter disclosed but not claimed herein.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. Self balancing measuring apparatus, comprising a bridge circuit including a slide wire resistance, a calibrating resistance and energizing means including a current regulator, a slider contact engaging and adjustable along said slide wire resistance, a current flow responsive device having two terminals one of which is connected to one end of said calibrating resistance, a standardizing circuit branch including a standard cell and a resistance, and having one end connected to the second end of said calibrating resistance, and a measuring circuit branch including a resistance and a source of voltage to be measured and connected at one end to said slider contact, switching means operable to connect the second terminal of said flow responsive device interchangeably to the second end of said standardizing branch and to the second end of said measuring branch, mechanism controlled by, and operating in selective accordance with the current flow through said device to adjust said regulator when said standardizing branch is connected to said flow responsive device, and to adjust said slider contact when said measuring branch is connected to said device, and a connection between the second terminal of said device and the second end of said calibrating resistance comprising means having electrical charge holding capacity whereby said mechanism is subject to a damping action during each standardizing operation and providing a flow of low conductivity for direct current whereby said slider contact is given a failure indicating adjustment when said measuring branch is connected to said flow responsive device and is in a non-conductive condition.

2. Measuring apparatus as specified in claim 1, in which the said means in the connection between the second terminal of said flow responsive device and the second end of said calibrating resistance is formed by a leaky condenser.

3. Measuring apparatus as specified in claim 1, in which the means in the said connection between the second terminal of said flow responsive device and the second end of said calibrating resistance is an electrolytic condenser through which a minute flow of direct current is maintained by the potential difference between the terminals of said calibrating resistance.

4. Measuring apparatus as specified in claim 1, in which the said connection between the second terminal of said flow responsive device and the second end of said calibrating resistance comprises a condenser and a resistance in parallel therewith.

5. Measuring apparatus as specified in claim 1, in which the mechanism controlled by said flow responsive device comprises a reversible electric actuating motor having a control winding operatively connected to said device.

6. Measuring apparatus as specified in claim 1, in which the mechanism controlled by said flow responsive device comprises a reversible electric motor having a control winding operatively connected to said device by said connecting means when said device is connected to said standardizing branch, and a second reversible electric motor having a control winding operatively connected to said device by said connecting means when the latter connects said device to said measuring circuit branch.

7. Measuring apparatus as specified in claim 1, in which the connection between the second terminal of the flow responsive device and the second end of the calibrating resistance comprises a condenser permanently connected in parallel with the standardizing circuit branch, and comprises a second resistance having one end connected to the second end of the calibrating resistance, and comprises a switch contact which is connected to the second end of said second resistance and is arranged for connection to said flow responsive device by said switching means when the latter is operated to connect said second terminal to the measuring circuit branch.

WALLACE E. BELCHER, Jr.